United States Patent
Shi et al.

(10) Patent No.: US 10,701,696 B2
(45) Date of Patent: Jun. 30, 2020

(54) TRANSMISSION CONFIGURATION METHOD AND RELATED PRODUCT

(71) Applicant: GUANGDONG OPPO MOBILE TELECOMMUNICATIONS CORP., LTD., Dongguan, Guangdong (CN)

(72) Inventors: Zhihua Shi, Guangdong (CN); Wenhong Chen, Guangdong (CN); Zhi Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/717,977

(22) Filed: Dec. 17, 2019

(65) Prior Publication Data

US 2020/0128546 A1    Apr. 23, 2020

Related U.S. Application Data

(63) Continuation of application No. PCT/CN2018/072513, filed on Jan. 12, 2018.

(51) Int. Cl.
*H04W 72/04* (2009.01)
*H04L 5/00* (2006.01)

(52) U.S. Cl.
CPC ....... *H04W 72/0453* (2013.01); *H04L 5/0053* (2013.01); *H04W 72/042* (2013.01)

(58) Field of Classification Search
CPC ............ H04W 72/0453; H04W 72/042; H04L 5/0053
See application file for complete search history.

(56) References Cited

U.S. PATENT DOCUMENTS

| 2012/0094703 | A1* | 4/2012 | Sasayama | H04W 24/10 455/507 |
| 2018/0343653 | A1* | 11/2018 | Guo | H04L 5/0053 |
| 2019/0200248 | A1* | 6/2019 | Basu Mallick | H04B 7/0695 |
| 2019/0223205 | A1* | 7/2019 | Papasakellariou | H04L 5/00 |

FOREIGN PATENT DOCUMENTS

| CN | 101159975 A | 4/2008 |
| CN | 106304349 A | 1/2017 |

* cited by examiner

*Primary Examiner* — Hashim S Bhatti
(74) *Attorney, Agent, or Firm* — Young Basile Hanlon & MacFarlane, P.C.

(57) ABSTRACT

A method for configuring transmission and related products are provided. The method includes: a network device indicates a Transmission Configuration Indicator (TCI) state set to a terminal, wherein the TCI state set is configured for a Bandwidth Part (BWP) of the terminal, and the TCI state set is used for indicating a Quasi co-location (QCL) assumption set when the terminal performs transmission on the BWP.

17 Claims, 4 Drawing Sheets

TRANSMISSION CONFIGURATION METHOD AND RELATED PRODUCT

CROSS-REFERENCE TO RELATED APPLICATION(S)

This application is a continuation application of International Application No. PCT/CN2018/072513, filed on Jan. 12, 2018, the entire content of which is incorporated herein by reference.

TECHNICAL FIELD

The present application relates to the field of communication technologies, and particularly, to a method for configuring transmission and related products.

BACKGROUND

In New Radio (NR), a carrier may contain multiple Bandwidth Parts (BWPs). For a terminal, only an uplink BWP can be activated for uplink transmission at a time. Similarly, only a downlink BWP can be activated for downlink transmission at a time. Which BWP is currently activated for the terminal is indicated by Downlink Control Information (DCI), etc. BWPs used by the terminal for transmission can be dynamically switched among multiple BWPs within a carrier. How to efficiently configure the terminal to perform transmission on different BWPs is a technical problem to be solved.

SUMMARY

Implementations of the present application provide a method for configuring transmission and related products.

In a first aspect, an implementation of the present application provides a method for configuring transmission, and the method includes: indicating, by a network device, a Transmission Configuration Indicator (TCI) state set to a terminal, wherein the TCI state set is configured for a Bandwidth Part (BWP) of the terminal, and the TCI state set is used for indicating a Quasi co-location (QCL) assumption set when the terminal performs transmission on the BWP.

In a second aspect, an implementation of the present application provides a method for configuring transmission, and the method includes: receiving, by a terminal, a Transmission Configuration Indicator (TCI) state set from a network device, wherein the TCI state set is configured for a Bandwidth Part (BWP) of the terminal, and the TCI state set is used for indicating a Quasi co-location (QCL) assumption set when the terminal performs transmission on the BWP.

In a third aspect, an implementation of the present application provides a network device. The network device has functions implementing acts of the network device designed in the foregoing method. The functions may be implemented by hardware, or may be implemented by hardware executing corresponding software. The hardware or software includes one or more modules corresponding to the foregoing functions. In a possible design, the network device includes a processor. The processor is configured to support the network device to perform corresponding functions in the foregoing method. Moreover, the network device may further include a transceiver. The transceiver is used for supporting communication between a terminal and the network device. The network device may further include a storage. The storage is coupled to the processor, and used for storing essential program instructions and data of the network device.

In a fourth aspect, an implementation of the present application provides a terminal. The terminal has functions of implementing acts of the terminal designed in the foregoing method. The functions may be implemented by hardware, or may be implemented by hardware executing corresponding software. The hardware or software includes one or more modules corresponding to the foregoing functions. In a possible design, the terminal includes a processor. The processor is configured to support the terminal to execute corresponding functions in the foregoing methods. Moreover, the terminal may further include a transceiver. The transceiver is used for supporting communication between the terminal and a network device. The terminal may further include a storage. The storage is coupled to the processor, and used for storing essential program instructions and data of the terminal.

In a fifth aspect, an implementation of the present application provides a network device. The network device includes a processor, a storage, a transceiver, and one or more programs, wherein the one or more programs are stored in the storage and configured to be executed by the processor, and the one or more program include instructions for executing acts in any method of the first aspect in the implementations of the present application.

In a sixth aspect, an implementation of the present application provides a terminal. The terminal includes a processor, a storage, a communication interface, and one or more programs, wherein the one or more programs are stored in the storage and configured to be executed by the processor, and the one or more programs include instructions for executing acts in any method of the second aspect in the implementations of the present application.

In a seventh aspect, an implementation of the present application further provides a computer-readable storage medium. The computer-readable storage medium stores computer programs for electronic data interchange, and the computer programs enable a computer to execute all or part of acts as described in any method of the first aspect in the implementations of the present application.

In an eighth aspect, an implementation of the present application further provides a computer-readable storage medium. The computer-readable storage medium stores computer programs for electronic data interchange, and the computer programs enable a computer to execute all or part of acts as described in any method of the second aspect in the implementations of the present application.

In a ninth aspect, an implementation of the present application further provides a computer program product. The computer program product includes a non-transitory computer-readable medium storing a computer program. The computer program is operable to enable a computer to execute all or part of acts as described in any method of the first aspect of the implementations of the present application. The computer program product may be a software installation package.

In a tenth aspect, an implementation of the present application further provides a computer program product. The computer program product includes a non-transitory computer-readable medium storing a computer program. The computer program is operable to enable a computer to execute all or part of acts as described in any method of the second aspect in the implementations of the present application. The computer program product may be a software installation package.

BRIEF DESCRIPTION OF DRAWINGS

The following is a brief description of accompanying drawings which are required for describing implementations or the prior art.

DETAILED DESCRIPTION

The following describes technical solutions in implementations of the present application with reference to the accompanying drawings.

Figure 1:
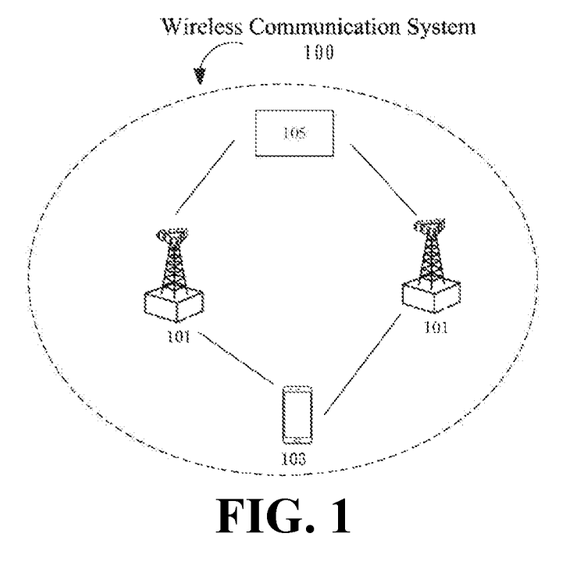
FIG. 1 is an example of a protocol architecture of a dual connectivity transmission mode supporting a data duplication function according to an implementation of the present application.

FIG. 1 shows a wireless communication system involved in the present application. The wireless communication system may work on a high frequency band, and the wireless communication system may be a 5th Generation (5G) system, a New Radio (NR) system, a Machine to Machine (M2M) system evolved in the future, or the like. As shown in FIG. 1, a wireless communication system 100 may include: one or more network devices 101, one or more terminals 103, and a core network device 105. The network device 101 may be a base station, and the base station may be used for communicating with one or more terminals, or may be used for communicating with one or more base stations with partial functions of the terminal (such as communication between a macro base station and a micro base station, e.g., an access point). The base station may be a base transceiver station (BTS) in a time division synchronous code division multiple access (TD-SCDMA) system, or an evolutional node B (eNB) in an LTE system, or a base station in the 5G system or the NR system. In addition, the base station may also be an Access Point (AP), a transport point (TRP), a Central Unit (CU), or other network entities, and may include parts or all of functions of the above network entities. The core network device 105 includes a device on the core network side such as a Serving GateWay (SGW). The terminal 103 may be distributed throughout the overall wireless communication system 100, which may be static or mobile. In some implementations of the present application, the terminal 103 may be a mobile device (e.g., a smart phone), a mobile station, a mobile unit, an M2M terminal, a wireless unit, a remote unit, a user agent, a mobile client, etc.

It should be noted that the wireless communication system 100 shown in FIG. 1 is only used for explaining technical solutions of the present application more clearly, and does not constitute a limitation to the present application. Those of ordinary skilled in the art can know that with evolving of network architectures and emerging of new service scenarios, technical solutions provided by the present application are also applicable to similar technical problems.

Related technologies involved in the present application are described below.

At present, in a current NR design, a terminal can be configured with multiple Downlink (DL) BWPs or Uplink (UL) BWPs, and can perform relatively dynamical transmission on different BWPs through DCI/Media Access Control layer Control Element (MAC CE), etc.

However, in a current beam management mechanism, many configurations cannot effectively support the above dynamic switching behavior on the BWPs. For example, in NR, a network can configure K Transmission Configuration Indicator (TCI) states. If K>8, 8 states need to be selected from K states through a MAC CE, then correspond to indication information of 3 bits in DCI; and if K<=8, then K states correspond to indication information of 3 bits in the DCI. A specific corresponding way may be specified by a protocol or configured by a network. If the dynamic switching of the BWPs is to be supported (for example, dynamic switching of 4 BWPs), and if 8 states correspond to 4 BWPs respectively, then there are only 2 states on each BWP on average, and selection and indications for beams (corresponding to 2 different beam indications) will be greatly limited on each BWP. Therefore, the existing solution and the dynamic BWP solution cannot work together efficiently.

To address the above problems, the present application provides following implementations, which will be described in detail below with reference to the accompanying drawings.

Figure 2:
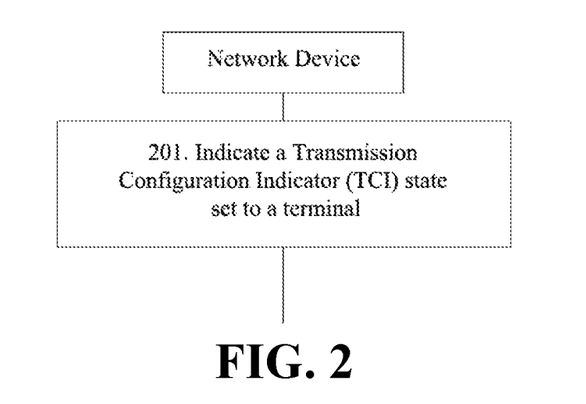
FIG. 2 is a schematic flowchart of a method for configuring transmission according to an implementation of the present application.

Referring to FIG. 2, FIG. 2 is a method for configuring transmission according to an implementation of the present application. The method, applied to the above example communication system, includes act 201.

In act 201, a network device indicates a Transmission Configuration Indicator (TCI) state set to a terminal, wherein the TCI state set is configured for a Bandwidth Part (BWP) of the terminal, and the TCI state set is used for indicating a Quasi co-location assumption set when the terminal performs transmission on the BWP.

The Quasi co-location assumption set refers to a set composed of multiple Quasi co-location assumptions, and each Quasi co-location assumption may contain one or more reference signals. If a certain target signal is associated with the Quasi co-location assumption, then it may be considered that the target signal is similar to or the same as some large-scale information of a channel corresponding to the above one or more signals, and specific large-scale information may also be included in the Quasi co-location assumption.

It can be seen that in the implementation of the present application, the network device indicates a Transmission Configuration Indicator (TCI) state set to the terminal, the TCI state set is configured for a Bandwidth Part (BWP) of the terminal, and the TCI state set is used for indicating a Quasi co-location assumption set when the terminal performs transmission on BWP. Therefore, for different BWPs of the terminal, flexibility can be effectively obtained by respectively configuring a TCI state set for each BWP. For example, in different Bandwidth Parts (BWPs), reference signals (CSI-RSs, SS/PBCH blocks) included in TCI states are different, and thus different TCI state sets need to be configured for different BWPs, so that beam management can be better performed. Otherwise, a same TCI state set is used for different BWPs, if a frequency domain interval of BWPs is relatively large, beam selection will not be optimal, and meanwhile, the terminal needs to switch between different BWPs to measure corresponding reference RSs or SS/PBCH blocks.

In a possible example, the TCI state set includes at least one TCI state set, and each TCI state set corresponds to one or more BWPs of the terminal.

In a possible example, the TCI state set includes K TCI states, where K is a positive integer greater than 8; and the method further includes: the network device selects a target TCI state set corresponding to a target BWP from the TCI state set; the network device selects 8 TCI states from K TCI states in the target TCI state set, wherein the 8 TCI states correspond to indication information of 3 bits in Downlink Control Information (DCI), and the DCI is used for indicating a Quasi co-location assumption state used by the target BWP for current transmission.

The Quasi co-location assumption state may include one or more reference signals. If a certain target signal is associated with the Quasi co-location assumption, then it may be considered that the target signal is similar to or the same as some large-scale information of a channel corresponding to the above one or more signals, and specific large-scale information may also be included in the Quasi co-location assumption.

In a possible example, the TCI state set includes K TCI states, where K is a positive integer less than or equal to 8; and the method further includes: the network device selects a target TCI state set corresponding to a target BWP from the TCI state set; and the K TCI states in the target TCI state set correspond to indication information of 3 bits in Downlink Control Information (DCI), and the DCI is used for indicating a Quasi co-location assumption state used by the target BWP for current transmission.

For example, a target TCI state set corresponding to a target BWP selected by the network device includes 6 states, then a corresponding relationship between the 6 states and the indication information of 3 bits in DCI may be as shown in Table 1.

TABLE 1

| State | Indication Information of 3 bits in DCI |
| --- | --- |
| State 1 | 000 |
| State 2 | 001 |
| State 3 | 011 |
| State 4 | 100 |
| State 5 | 101 |
| State 6 | 111 |

In a possible example, the TCI state set includes X TCI state sets, where X is a positive integer; and the method further includes: the network device configures the X TCI state sets for the terminal, and/or, uses a Medium Access Control layer Control Element (MAC CE) to select corresponding 8 states for part or all of TCI state sets, and each TCI state set corresponds to one or more BWPs. The network device indicates activation of the BWP of the terminal, wherein the indication is used for the terminal to determine the TCI state set corresponding to the BWP, and/or to determine the 8 states corresponding to the BWP.

In an example, the network device may configure X TCI state sets for the terminal, and indicates activation of the BWP of the terminal. The indication is used for the terminal to determine the TCI state set corresponding to the BWP.

In another example, the network device may use a Media Access Control layer Control Element (MAC CE) to select 8 corresponding states for some or all of TCI state sets, and indicate activation of the BWP of the terminal. The indication is used for the terminal to determine the 8 states corresponding to the BWP.

It can be seen that in the example, the network device configures X TCI state sets and/or uses a Media Access Control layer Control Element (MAC CE) to select corresponding 8 states for some or all of TCI state sets, to enable a terminal to determine a TCI state set corresponding to a BWP, and/or determine 8 states corresponding to the BWP. Therefore, flexibility is further improved.

In a possible example, the TCI state set includes X TCI state sets, and each TCI state set includes K TCI states, K is a positive integer greater than 8; and the method further includes: when indicating activation of the BWP of the terminal, the network device uses a MAC CE to select 8 states included in the TCI state set corresponding to the BWP from the X TCI state sets. The X TCI state sets are preconfigured through a high-layer signaling, where X is a positive integer.

It can be seen that in the example, for the case in which K is greater than 8, when activating the BWP of the terminal, the network device is able to directly use a MAC CE to select 8 states included in the TCI state set corresponding to the BWP, thereby improving configuration efficiency.

In a possible example, the method further includes: when indicating activation of a BWP of the terminal, the network device configures the corresponding TCI state set for the BWP, and/or using a Medium Access Control layer Control Element (MAC CE) to select 8 corresponding states.

The network device uses the 8 states selected by the MAC CE for indicating the terminal to use a Quasi co-location assumption state indicated by 3 bits in DCI when the terminal performs transmission on the BWP.

Figure 3:
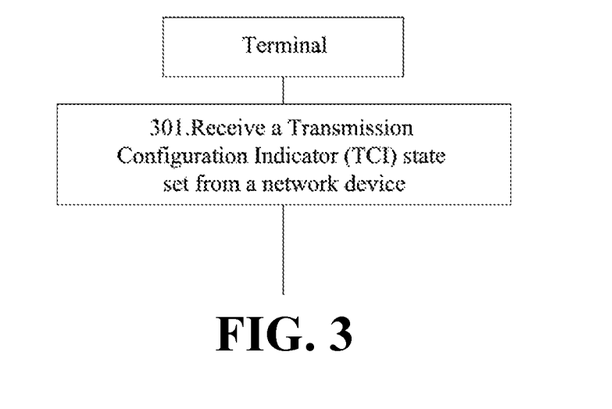
FIG. 3 is a schematic flowchart of a method for configuring transmission according to an implementation of the present application.

Consistent with the implementation shown in FIG. 2, referring to FIG. 3, FIG. 3 is another method for configuring transmission provided by an implementation of the present application. The method includes act 301.

In 301, a terminal receives a Transmission Configuration Indicator (TCI) state set from a network device, wherein the TCI state set is configured for a Bandwidth Part (BWP) of the terminal, and the TCI state set is used for indicating a Quasi co-location assumption set when the terminal performs transmission on the BWP.

It can be seen that in the implementation of the present application, the terminal receives a Transmission Configuration Indicator (TCI) state set from a network device, wherein the TCI state set is configured for a Bandwidth Part (BWP) of the terminal, and the TCI state set is used for indicating a Quasi co-location assumption set when the terminal performs transmission on the BWP. Therefore, flexibility can be effectively obtained by respectively configuring a TCI state set for each BWP of different BWPs of the terminal. For example, in different Bandwidth Parts (BWPs), reference signals (CSI-RSs, SS/PBCH blocks) included in TCI states are different, and thus different TCI state sets need to be configured for different BWPs, so that beam management is better performed. Otherwise, a same TCI state set is used for different BWPs, in which case if a frequency domain interval of the BWPs is relatively large, beam selection will not be optimal, and meanwhile, the terminal needs to switch between different BWPs to measure corresponding reference RSs or SS/PBCH blocks.

In a possible example, the TCI state set includes at least one TCI state set, and each TCI state set corresponds to one or more BWPs of the terminal.

In a possible example, the TCI state set includes K TCI states, where K is a positive integer greater than 8. The method further includes: the terminal receives Downlink Control Information (DCI). Indication information of 3 bits in the DCI corresponds to 8 TCI states, the 8 TCI states are selected by the network device from the K TCI states in a target TCI state set, the target TCI state set is a TCI state set corresponding to a target BWP selected by the network device from the TCI state set, and the DCI is used for indicating a Quasi co-location assumption state used by the target BWP for current transmission.

In a possible example, the TCI state set includes K TCI states, where K is a positive integer less than or equal to 8. The method further includes: the terminal receives Downlink Control Information (DCI). Indication information of 3 bits in the DCI corresponds to K TCI states in a target TCI state set, the target TCI state set is a TCI state set corresponding to a target BWP determined by the terminal from the TCI state set, and the DCI is used for indicating a Quasi co-location assumption state used by the target BWP for current transmission.

In a possible example, the method further includes: the terminal receives an indication for activating the BWP from the network device, the terminal determines a TCI state set corresponding to the BWP, the TCI state set is a TCI state set in X TCI state sets configured by the network device, and each TCI state set corresponds to one or more BWPs, where X is a positive integer; and/or the terminal receives an indication for activating the BWP from a network device, the terminal determines 8 states corresponding to the BWP, and the 8 states are states selected by the network device using a Media Access Control layer Control Element (MAC CE) from the TCI state set corresponding to the BWP.

Figure 4:
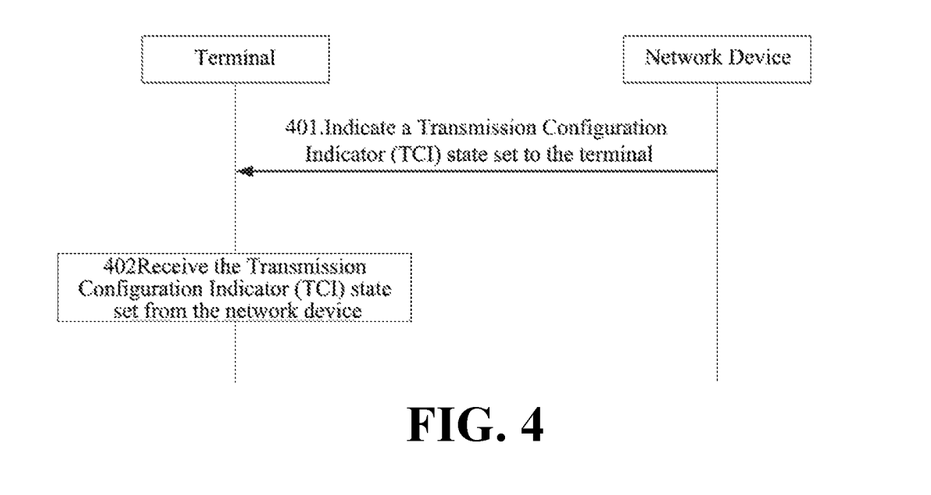
FIG. 4 is a schematic flowchart of a method for configuring transmission according to an implementation of the present application.

Consistent with the implementations shown in FIG. 2 and FIG. 3, referring to FIG. 4, FIG. 4 is a method for configuring transmission according to an implementation of the present application. The method, applied to the above example communication system, includes acts 401 and 402.

In act 401, a network device indicates a Transmission Configuration Indicator (TCI) state set to a terminal. The TCI state set is configured for a Bandwidth Part (BWP) of the terminal, and the TCI state set is used for indicating a Quasi co-location assumption set when the terminal performs transmission on the BWP.

In act 402, the terminal receives the Transmission Configuration Indicator (TCI) state set from the network device. The TCI state set is configured for the Bandwidth Part (BWP) of the terminal, and the TCI state set is used for indicating the Quasi co-location assumption set when the terminal performs transmission on the BWP.

It can be seen that in the implementation of the present application, the network device indicates a Transmission Configuration Indicator (TCI) state set to the terminal, the TCI state set is configured for a Bandwidth Part (BWP) of the terminal, and the TCI state set is used for indicating a Quasi co-location assumption set when the terminal performs transmission on the BWP. Therefore, flexibility can be effectively obtained by respectively configuring a TCI state set for each BWP of different BWPs of the terminal. For example, in different Bandwidth Parts (BWPs), reference signals (CSI-RSs, SS/PBCH blocks) included in TCI states are different, and thus different TCI state sets need to be configured for different BWPs, so that beam management is better performed. Otherwise, a same TCI state set is used for different BWPs, in which case if a frequency domain interval of BWPs is relatively large, beam selection will not be optimal, and meanwhile, the terminal needs to switch between different BWPs to measure corresponding reference RSs or SS/PBCH blocks.

Figure 5:
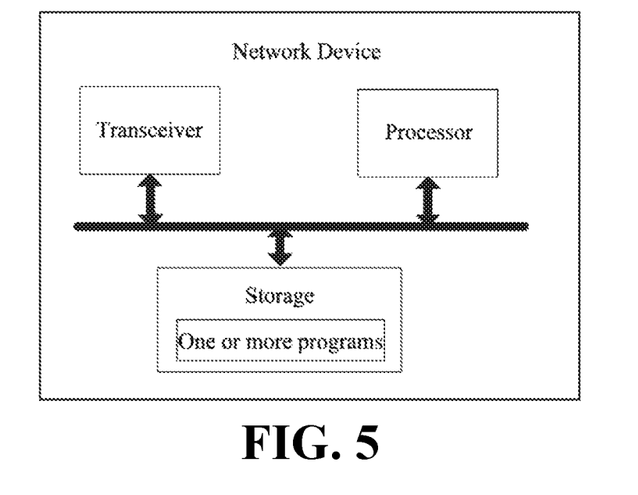
FIG. 5 is a schematic diagram of structure of a network device according to an implementation of the present application.

Consistent with the above implementation, referring to FIG. 5, FIG. 5 is a schematic diagram of structure of a network device according to an implementation of the present application, the network device is a first network device. As shown in FIG. 5, the network device includes a processor, a storage, a transceiver, and one or more programs. The one or more programs are stored in the storage and configured to be executed by the processor, and the programs include instructions for performing following acts: indicating a Transmission Configuration Indicator (TCI) state set to a terminal, wherein the TCI state set is configured for a Bandwidth Part (BWP) of the terminal, and the TCI state set is used for indicating a Quasi co-location assumption set when the terminal performs transmission on the BWP.

It can be seen that in the implementation of the present application, the network device indicates a Transmission Configuration Indicator (TCI) state set to the terminal, wherein the TCI state set is configured for a Bandwidth Part (BWP) of the terminal, and the TCI state set is used for indicating a Quasi co-location assumption set when the terminal performs transmission on the BWP. Therefore, flexibility can be effectively obtained by respectively configuring a TCI state set for each BWP of different BWPs of the terminal. For example, in different Bandwidth Parts (BWPs), reference signals (CSI-RSs, SS/PBCH blocks) included in TCI states are different, and thus different TCI state sets need to be configured for different BWPs, so that beam management is better performed. Otherwise, a same TCI state set is used for different BWPs, in which case if a frequency domain interval of BWPs is relatively large, beam selection will not be optimal, and meanwhile, the terminal needs to switch between different BWPs to measure corresponding reference RSs or SS/PBCH blocks.

In a possible example, the TCI state set includes at least one TCI state set, and each TCI state set corresponds to one or more BWPs of the terminal.

In a possible example, the TCI state set includes K TCI states, where K is a positive integer greater than 8. The program further includes instructions for performing following acts: selecting a target TCI state set corresponding to a target BWP from the TCI state set; and selecting 8 TCI states from K TCI states in the target TCI state set, wherein the 8 TCI states correspond to indication information of 3 bits of Downlink Control Information (DCI), and the DCI is used for indicating a Quasi co-location assumption state used by the target BWP for current transmission.

In a possible example, the TCI state set includes K TCI states, where K is a positive integer less than or equal to 8. The program further includes instructions for performing following acts: selecting a target TCI state set corresponding to a target BWP from the TCI state set; the K TCI states in the target TCI state set correspond to indication information of 3 bits in Downlink Control Information (DCI), and the DCI is used for indicating a Quasi co-location assumption state used by the target BWP for current transmission.

In a possible example, the TCI state set includes X TCI state sets, where X is a positive integer. The program further includes instructions for performing following acts: configuring the X TCI state sets for the terminal, and/or using a Medium Access Control layer Control Element (MAC CE) to select corresponding 8 states for part or all of TCI state sets, wherein each TCI state set corresponds to one or more BWPs; and indicating activation of the BWP of the terminal, wherein the indication is used for the terminal to determine the TCI state set corresponding to the BWP, and/or to determine the 8 states corresponding to the BWP.

In a possible example, the TCI state set includes X TCI state sets, wherein each TCI state set includes K TCI states, and K is a positive integer greater than 8. The program further includes instructions for performing following acts: when activation of the BWP of the terminal is indicated, using an MAC CE to select 8 states included in the TCI state set corresponding to the BWP from the X TCI state sets, wherein the X TCI state sets are preconfigured through a high-layer signaling, where X is a positive integer.

In a possible example, the program further includes instructions for performing following acts: when activation of the BWP of the terminal is indicated, configuring a corresponding TCI state set for the BWP, and/or using a Medium Access Control layer Control Element (MAC CE) to select corresponding 8 states.

Figure 6:
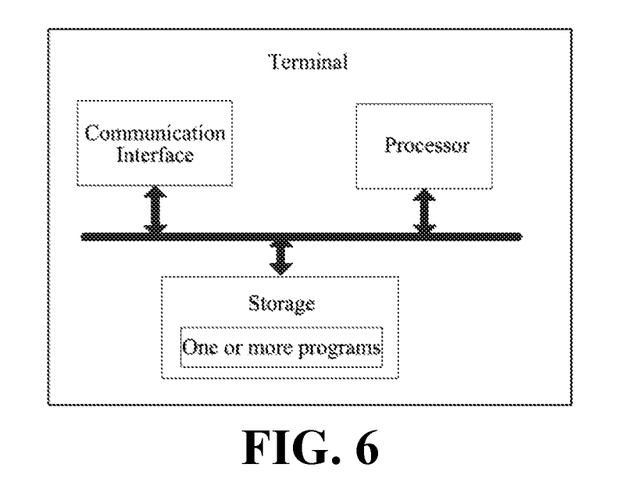
FIG. 6 is a schematic diagram of structure of a terminal according to an implementation of the present application.

Consistent with the above implementation, referring to FIG. 6, FIG. 6 is a schematic diagram of structure of a terminal according to an implementation of the present application. As shown in FIG. 6, the terminal includes a processor, a storage, a communication interface, and one or more programs. The one or more programs are stored in the storage and configured to be executed by the processor, and the programs includes instructions for performing following acts: receiving a Transmission Configuration Indicator (TCI) state set from a network device, wherein the TCI state set is configured for a Bandwidth Part (BWP) of the terminal, and the TCI state set is used for indicating a Quasi co-location assumption set when the terminal performs transmission on the BWP.

It can be seen that in the implementation of the present application, the terminal receives a Transmission Configuration Indicator (TCI) state set from the network device, the TCI state set is configured for a Bandwidth Part (BWP) of the terminal, and the TCI state set is used for indicating a Quasi co-location assumption set when the terminal performs transmission on the BWP. Therefore, flexibility can be effectively obtained by respectively configuring a TCI state set for each BWP of different BWPs of a terminal. For example, in different Bandwidth Parts (BWPs), reference signals (CSI-RSs, SS/PBCH blocks) included in TCI states are different, and thus different TCI state sets need to be configured for different BWPs, so that beam management is better performed. Otherwise, a same TCI state set is used for different BWPs, in which case if a frequency domain interval of BWPs is relatively large, beam selection will not be optimal, and meanwhile, the terminal needs to switch between different BWPs to measure corresponding reference RSs or SS/PBCH blocks.

In a possible example, the TCI state set includes at least one TCI state set, and each TCI state set corresponds to one or more BWPs of the terminal.

In a possible example, the TCI state set includes K TCI states, where K is a positive integer greater than 8. The program further includes instructions for performing following acts: receiving Downlink Control Information (DCI), wherein indication information of 3 bits in the DCI corresponds to 8 TCI states, the 8 TCI states are selected by the network device from K TCI states in a target TCI state set, the target TCI state set is a TCI state set corresponding to a target BWP selected by the network device from the TCI state set, and the DCI is used for indicating a Quasi co-location assumption state used by the target BWP for current transmission.

In a possible example, the TCI state set includes K TCI states, where K is a positive integer less than or equal to 8. The program further includes instructions for performing following acts: receiving Downlink Control Information (DCI), wherein indication information of 3 bits in the DCI corresponds to K TCI states in a target TCI state set, the target TCI state set is a TCI state set corresponding to a target BWP determined by the terminal from the TCI state set, and the DCI is used for indicating a Quasi co-location assumption state used by the target BWP for current transmission.

In a possible example, the TCI state set includes X TCI state sets, wherein X is a positive integer. The program further includes instructions for performing following acts: receiving an indication from a network device for activating the BWP; and determining a TCI state set corresponding to the BWP, wherein the TCI state set is a TCI state set in the X TCI state sets configured by the network device, and each TCI state set corresponds to one or more BWPs; and/or receiving an indication for activating the BWP from the network device; and determining 8 states corresponding to the BWP, wherein the 8 states are states selected by the network device from the TCI state set corresponding to the BWP using a Medium Access Control layer Control Element (MAC CE).

The foregoing describes the solutions provided in the implementations of the present application mainly from a perspective of interaction between network elements. It can be understood that the terminal and the network device include corresponding hardware structures and/or software modules for performing the various functions, so as to implement the foregoing functions. A person skilled in the art should easily understand that, in combination with units and algorithm steps in examples described with reference to the implementations disclosed herein, the present application may be implemented by hardware or a combination of hardware and computer software. Whether a function is performed by hardware or computer software driving hardware depends on a particular application and a design constraint condition of the technical solution. A person skilled in the art may use different methods to implement the described functions for each particular application, but it should not be considered that such an implementation goes beyond the scope of the present application.

In the implementations of the present application, division for functional units can be performed on the terminal and network device according to the above method examples. For example, various functional units may be divided according to various functions, or two or more functions can be integrated into one processing unit. The above integrated unit may be implemented in a form of hardware, or may be implemented in a form of a software program module. It should be noted that, the division for the units in the implementations of the present application is illustrative, and is merely the division of logical functions. Other division modes may be used in actual implementations.

Figure 7:
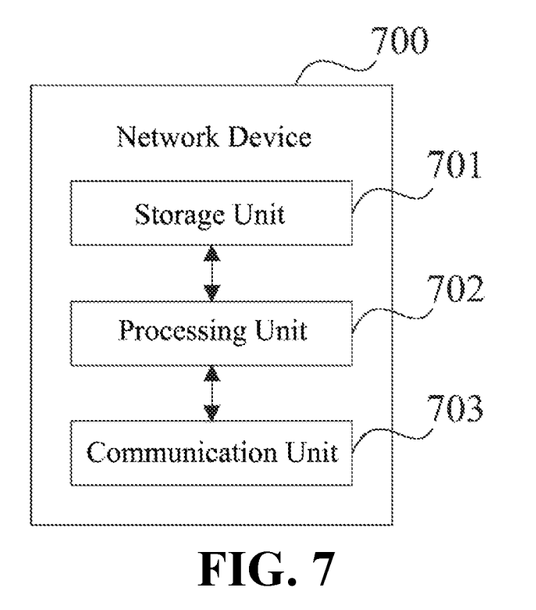
FIG. 7 is a schematic diagram of structure of a network device according to an implementation of the present application.

In a case that an integrated unit is used, FIG. 7 illustrates a block diagram of possible composition of functional units of a network device related to the above implementations. The network device is a first network device. A network device 700 includes a processing unit 702 and a communication unit 703. The processing unit 702 is used for controlling and managing acts of the network device. For example, the processing unit 702 is used for supporting the network device to perform act 201 in FIG. 2, act 401 in FIG. 4, and/or other processes of techniques described in this document. The communication unit 703 is used for supporting communication between the network device and other devices, such as communication between the terminal as shown in FIG. 6. The network device further includes a storage unit 701 used for storing program codes and data of the network device.

The processing unit 702 may be a processor or a controller, the communication unit 703 may be a transceiver, a transceiving circuit, or a radio frequency chip, and storage unit 701 may be a storage.

The processing unit 702 is used for indicating a Transmission Configuration Indicator (TCI) state set to a terminal through the communication unit 703, the TCI state set is configured for a Bandwidth Part (BWP) of the terminal, and the TCI state set is used for indicating a Quasi co-location assumption set when the terminal performs transmission on the BWP.

In a possible example, the TCI state set includes at least one TCI state set, and each TCI state set corresponds to one or more BWPs of the terminal.

In a possible example, the TCI state set includes K TCI states, where K is a positive integer greater than 8. The processing unit 702 is further used for: selecting a target TCI state set corresponding to a target BWP from the TCI state set; and selecting 8 TCI states from K TCI states in the target TCI state set. The 8 TCI states correspond to indication information of 3 bits in Downlink Control Information (DCI), and the DCI is used for indicating a Quasi co-location assumption state used by the target BWP for current transmission.

In a possible example, the TCI state set includes K TCI states, where K is a positive integer less than or equal to 8. The processing unit 702 is further used for: selecting a target TCI state set corresponding to a target BWP from the TCI state set. The K TCI states in the target TCI state set correspond to indication information of 3 bits in Downlink Control Information (DCI), and the DCI is used for indicating a Quasi co-location assumption state used by the target BWP for current transmission.

In a possible example, the TCI state set includes X TCI state sets, where X is a positive integer. The processing unit 702 is further used for: configuring the X TCI state sets for the terminal, and/or using a Medium Access Control layer Control Element (MAC CE) to select corresponding 8 states for part or all of TCI state sets, wherein, each TCI state set corresponds to one or more BWPs; and indicating activation of the BWP of the terminal, wherein the indication is used for the terminal to determine the TCI state set corresponding to the BWP, and/or to determine the 8 states corresponding to the BWP.

In a possible example, the TCI state set includes X TCI state sets, and each TCI state set includes K TCI states, where K is a positive integer greater than 8. The processing unit 702 is further used for: when activation of the BWP of the terminal is indicated, using a MAC CE to select, from the X TCI state sets, 8 states included in the TCI state set corresponding to the BWP. The X TCI state sets are preconfigured through a high-layer signaling, where X is a positive integer.

In a possible example, the processing unit 702 is further used for, when activation of the BWP of the terminal is indicated, configuring a corresponding TCI state set for the BWP, and/or using a Medium Access Control layer Control Element (MAC CE) to select 8 corresponding states.

When the processing unit 702 is a processor, the communication unit 703 is a communication interface, and the storage unit 701 is a storage, the network device related to the implementation of the present application may the network device shown in FIG. 5.

Figure 8:
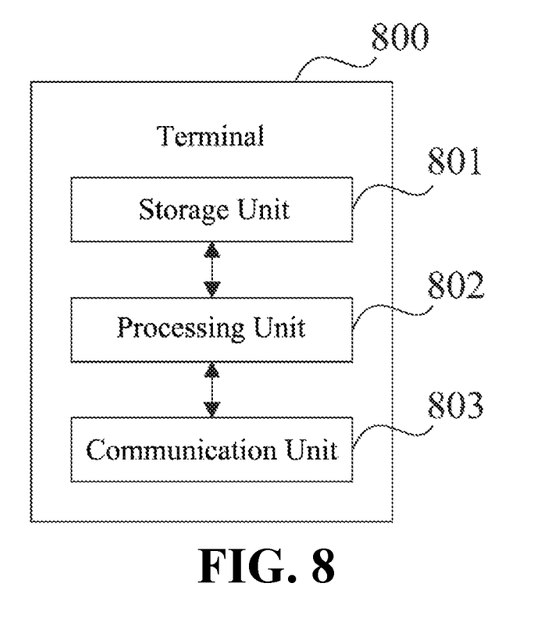
FIG. 8 is a schematic diagram of structure of a terminal according to an implementation of the present application.

In the case that an integrated unit is used, FIG. 8 illustrates a block diagram of composition of possible functional units of a terminal related to the above implementations. A terminal 800 includes a processing unit 802 and a communication unit 803. The processing unit 802 is used for controlling and managing acts of the terminal. For example, the processing unit 802 is used for supporting the terminal to perform act 301 in FIG. 3, act 402 in FIG. 4, and/or other processes for techniques described in this document. The communication unit 803 is used for supporting communication between the terminal and other devices, such as communication between the network device as illustrated in FIG. 5. The terminal may further include a storage unit 801 used for storing program codes and data of the terminal.

The processing unit 802 may be a processor or a controller, such as a Central Processing Unit (CPU), a general purpose processor, a Digital Signal Processor (DSP), an Application-Specific Integrated Circuit (ASIC), a Field Programmable Gate Array (FPGA), or other programmable logic device, transistor logic device, hardware component, or any combination thereof. The processing unit 601 may implement or execute the various illustrative logical blocks, modules, and circuits described in combination with disclosed contents of the present application. The processor may also be a combination for implementing computing functions, e.g., a combination including one or more microprocessors, a combination of a DSP and a microprocessor. The communication unit 803 may be a transceiver or a transceiving circuit, and so on. The storage unit 801 may be a storage.

The processing unit 802 is used for receiving a Transmission Configuration Indicator (TCI) state set from the network device through the communication unit 803, wherein the TCI state set is configured for a Bandwidth Part (BWPs) of the terminal, and the TCI state set is used for indicating a Quasi co-location assumption set when the terminal performs transmission on the BWP.

In a possible example, the TCI state set includes at least one TCI state set, and each TCI state set corresponds to one or more BWPs of the terminal.

In a possible example, the TCI state set includes K TCI states, where K is a positive integer greater than 8. The processing unit 802 is further used for: receiving Downlink Control Information (DCI) through the communication unit 803. Indication information of 3 bits in the DCI corresponds to 8 TCI states, the 8 TCI states are selected by the network device from K TCI states in a target TCI state set, the target TCI state set is a TCI state set corresponding to a target BWP selected by the network device from the TCI state set, and the DCI is used for indicating a Quasi co-location assumption state used by the target BWP for current transmission.

In a possible example, the TCI state set includes K TCI states, where K is a positive integer less than or equal to 8. The processing unit 802 is further used for: receiving Downlink Control Information (DCI) through the communication unit 803. The indication information of 3 bits in the DCI corresponds to K TCI states in a target TCI state set, the target TCI state set is a TCI state set corresponding to a target BWP determined by the terminal from the TCI state set, and the DCI is used for indicating a Quasi co-location assumption state used by the target BWP for current transmission.

In a possible example, the TCI state set includes X TCI state sets, where X is a positive integer. The processing unit 802 is further used for: receiving an indication for activating the BWP from the network device through the communication unit 803; and determining a TCI state set corresponding to the BWP, wherein the TCI state set is a TCI state set in the X TCI state sets configured by the network device, and each TCI state set corresponds to one or more BWPs; and/or receiving an indication for activating the BWP from a network device through the communication unit 803; and determining 8 states corresponding to the BWP, wherein the 8 states are states selected by the network device, from the TCI state set corresponding to the BWP, using a Medium Access Control layer Control Element (MAC CE).

When the processing unit 802 is a processor, the communication unit 803 is a communications interface, and the storage unit 801 is a storage, the terminal related to implementations of the present application may be the terminal shown in FIG. 6.

An implementation of the present application also provides a computer readable storage medium. The computer readable storage medium stores a computer program for electronic data interchange, and the computer program enables a computer to perform parts or all of the acts as described for the terminal in the above method implementations.

An implementation of the present application also provides a computer readable storage medium. The computer readable storage medium stores a computer program for electronic data interchange, and the computer program enables a computer to execute parts or all of the acts described for the network device in the above method implementations.

An implementation of the present application also provides a computer program product. The computer program product includes a non-transitory computer readable storage medium storing a computer program, and the computer program is operable to enable a computer to perform parts or all of the acts as described for the terminal in the above method implementations. The computer program product may be a software installation package.

An implementation of the present application also provides a computer program product. The computer program product includes a non-transitory computer readable storage medium storing a computer program, and the computer program is operable to enable a computer to perform parts or all of the acts as described for the network device in the above methods. The computer program product may be a software installation package.

The acts of the method or algorithm described in the implementations of the present application may be implemented in hardware or may be implemented by a processor executing software instructions. The software instructions may be composed by corresponding software modules. The software modules may be stored in a Random Access Memory (RAM), a flash memory, a Read Only Memory (ROM), an Erasable Programmable Read Only Memory (EPROM), an Electrically Erasable Programmable Read Only Memory (EEPROM), a register, a hard disk, a removable hard disk, a Compact Disc Read-Only Memory (CD-ROM), or a storage medium in any other form well-known in the art. An example storage medium is coupled to the processor such that the processor can read information from a storage medium, and write information to the storage medium. The storage medium may be a component of the processor. The processor and the storage medium may be located in an ASIC. In addition, the ASIC may be located in an access network device, a target network device, or a core network device. The processor and the storage medium may also act as separate components in the access network device, the target network device, or the core network device.

Those skilled in the art should realize that in one or more examples described above, the functions described in the implementations of the present application may be implemented in whole or in parts through software, hardware, firmware, or any combination thereof. When the functions described in the implementations of the present application are implemented through software, these functions may be implemented in whole or in parts in the form of a computer program product. The computer program product includes one or more computer instructions. When the computer program instructions are loaded and executed on a computer, the processes or functions are generated in whole or in parts according to the implementations of the present application. The computer may be a general purpose computer, a special purpose computer, a computer network, or other programmable devices. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, a Digital Subscriber Line (DSL)) or a wireless mode (e.g., infrared radiation, radio, microwave, etc). The computer-readable storage medium may be any available medium that the computer can access, or a data storage device such as an integrated server or data center that comprises one or more available media. The available medium may be a magnetic medium (e.g., a floppy disk, a hard disk, a magnetic tape), an optical medium (e.g., a Digital Video Disc (DVD)), or a semiconductor medium (e.g., a Solid State Disk (SSD)), or the like.

The above specific implementation modes make further explanation for purposes, technical solutions and beneficial effects of implementations of the present application in detail. It should be understood that the above is only the specific implementation modes of implementations of the present application, and is not used for limiting the protection scope of implementations of the present application. Any modification, equivalent substitution, improvement, etc., made on the basis of the technical solutions of implementations of the present application shall be included in the protection scope of implementations of the present application.

What is claimed is:

1. A method for configuring transmission, comprising:
 indicating, by a network device, a Transmission Configuration Indicator (TCI) state set to a terminal, wherein the TCI state set is configured for a Bandwidth Part (BWP) of the terminal, and the TCI state set is used for indicating a Quasi co-location (QCL) assumption set used by the terminal when the terminal performs transmission on the BWP;
 wherein the TCI state set comprises K TCI states; and
 when K is a positive integer greater than 8, the method further comprises:
  selecting, by the network device, a target TCI state set corresponding to a target BWP from the TCI state set; and
  selecting, by the network device, 8 TCI states from K TCI states in the target TCI state set, wherein the 8 TCI states correspond to indication information of 3 bits in Downlink Control Information (DCI), and the DCI is used for indicating a QCL assumption state used by the target BWP for current transmission.

2. The method of claim 1, wherein the TCI state set comprises at least one TCI state set, and each TCI state set in the at least one TCI state set corresponds to one or more BWPs of the terminal.

3. The method of claim 1, wherein the TCI state set comprises K TCI states; and
when K is a positive integer less than or equal to 8, the method further comprises: selecting, by the network device, a target TCI state set corresponding to a target BWP from the TCI state set, wherein K TCI states in the target TCI state set correspond to indication information of 3 bits in Downlink Control Information (DCI), wherein the DCI is used for indicating a QCL assumption state used by the target BWP for current transmission.

4. The method of claim 1, wherein the TCI state set comprises X TCI state sets, and X is a positive integer;
the method further comprises at least one of: configuring, by the network device, the X TCI state sets for the terminal, or using a Medium Access Control layer Control Element (MAC CE) to select 8 corresponding states for part or all of the TCI state sets, wherein each TCI state set in the X TCI state sets corresponding to one or more BWPs; and
indicating, by the network device, activation of the BWP of the terminal, wherein the indication is used for the terminal to determine at least one of the TCI state set corresponding to the BWP, or the 8 states corresponding to the BWP.

5. The method of claim 1, wherein the TCI state set comprises X TCI state sets, each TCI state set comprises K TCI states, and K is a positive integer greater than 8; and
the method further comprises: when indicating activation of the BWP of the terminal, using, by the network device, a Media Access Control layer Control Element (MAC CE) to select 8 states comprised in the TCI state set corresponding to the BWP from the X TCI state sets, wherein the X TCI state sets are preconfigured through a high-layer signaling, and X is a positive integer.

6. The method of claim 1, the method further comprises:
when indicating activation of the BWP of the terminal, at least one of: configuring, by the network device, a corresponding TCI state set for the BWP, or using a Media Access Control layer Control Element (MAC CE) to select 8 corresponding states.

7. A method for configuring transmission, comprising:
receiving, by a terminal, a Transmission Configuration Indicator (TCI) state set from a network device, wherein the TCI state set is configured for a Bandwidth Part (BWP) of the terminal, and the TCI state set is used for indicating a Quasi co-location (QCL) assumption set used by the terminal when the terminal performs transmission on the BWP;
wherein the TCI state set comprises K TCI states; and
when K is a positive integer greater than 8, the method further comprises: receiving, by the terminal, Downlink Control Information (DCI), wherein indication information of 3 bits in the DCI corresponds to 8 TCI states, the 8 TCI states are selected by the network device from K TCI states in a target TCI state set, the target TCI state set is a TCI state set selected by the network device from the TCI state set, the target TCI state set corresponds to a target BWP, and the DCI is used for indicating a QCL assumption slate used by the target BWP for current transmission.

8. The method of claim 7, wherein the TCI state set comprises at least one TCI state set, and each TCI state set in the at least one TCI state set corresponds to one or more BWPs of the terminal.

9. The method of claim 7, wherein the TCI state set comprises K TCI states; and
when K is a positive integer less than or equal to 8, the method further comprises: receiving, by the terminal, Downlink Control Information (DCI), wherein indication information of 3 bits in the DCI corresponds to K TCI states in a target TCI state set, the target TCI state set is a TCI state set determined by the terminal from the TCI state set, the target TCI state set corresponds to a target BWP, and the DCI is used for indicating a QCL assumption state used by the target BWP for current transmission.

10. The method of claim 7, wherein the TCI state set comprises X TCI state sets, and X is a positive integer;
the method further comprises: receiving, by the terminal, an indication for activating the BWP from the network device; and
determining, by the terminal, a TCI state set corresponding to the BWP, wherein the TCI state set corresponding to the BWP is a TCI state set in the X TCI state sets configured by the network device, and each TCI state set in the X TCI state sets corresponds to one or more BWPs; and/or,
receiving, by the terminal, an indication for activating the BWP from the network device; and
determining, by the terminal, 8 states corresponding to the BWP, wherein the 8 states are states selected by the network device using a Media Access Control layer Control Element (MAC CE) from a TCI state set corresponding to the BWP.

11. A network device, comprising: a processor, a storage, a transceiver, and one or more programs, wherein the one or more programs are stored in the storage and configured to be executed by the processor, and the one or more programs comprise instructions for performing an act of:
indicating a Transmission Configuration Indicator (TCI) state set to a terminal, wherein the TCI state set is configured for a Bandwidth Part (BWP) of the terminal, and the TCI state set is used for indicating a Quasi co-location (QCL) assumption set used by the terminal when the terminal performs transmission on the BWP;
wherein the TCI state set comprises K TCI states; and
when K is a positive integer greater than 8, the one or more programs comprise instructions for performing acts of: selecting a target TCI state set corresponding to a target BWP from the TCI state set; and selecting 8 TCI states from K TCI states in the target TCI state set, wherein the 8 TCI states correspond to indication information of 3 bits in Downlink Control Information (DCI), and the DCI is used for indicating a QCL assumption state used by the target BWP for current transmission.

12. The network device of claim 11, wherein the TCI state set comprises at least one TCI state set, and each TCI state set in the at least one TCI state set corresponds to one or more BWPs of the terminal.

13. The network device of claim 11, wherein the one or more programs are stored in the storage and configured to be executed by the processor, and the one or more programs comprise instructions for performing an act of:

when indicating activation of the BWP of the terminal, at least one of: configuring a corresponding TCI state set for the BWP, or using a Media Access Control layer Control Element (MAC CE) to select 8 corresponding states.

14. A terminal device, comprising: a processor, a storage, a communication interface, and one or more programs, wherein the one or more programs are stored in the storage and configured to be executed by the processor, and the one or more programs comprise instructions for performing an act of: receiving a Transmission Configuration Indicator (TCI) state set from a network device, wherein the TCI state set is configured for a Bandwidth Part (BWP) of the terminal, and the TCI state set is used for indicating a Quasi co-location (QCL) assumption set used by the terminal when the terminal performs transmission on the BWP; wherein the TCI state set comprises K TCI states; and when K is a positive integer greater than 8, the one or more programs are stored in the storage and configured to be executed by the processor, and the one or more programs comprise instructions for performing an act of: receiving Downlink Control Information (DCI), wherein indication information of 3 bits in the DCI corresponds to 8 TCI state, the 8 TCI states are selected by the network device from K TCI states in a target TCI state set, the target TCI state set is a TCI state set selected by the network device from the TCI state set, the target TCI set corresponds to a target BWP, and the DCI is used for indicating a QCL assumption state used by the target BWP for current transmission.

15. The terminal device of claim 14, wherein the TCI state set comprises at least one TCI state set, and each TCI state set in the at least one TCI state set corresponds to one or more BWPs of the terminal.

16. The terminal device of claim 14, wherein the TCI state set comprises K TCI states; and
when K is a positive integer less than or equal to 8, the one or more programs are stored in the storage and configured to be executed by the processor, and the one or more programs comprise instructions for performing an act of: receiving Downlink Control Information (DCI), wherein indication information of 3 bits in the DCI corresponds to K TCI states in a target TCI state set, the target TCI state set is a TCI state set determined by the terminal from the TCI state set, the target TCI state set corresponds to a target BWP, and the DCI is used for indicating a QCL assumption state used by the target BWP for current transmission.

17. The terminal device of claim 14, wherein the TCI state set comprises X TCI state sets, and X is a positive integer;
the one or more programs are stored in the storage and configured to be executed by the processor, and the one or more programs comprise instructions for performing an act of: receiving an indication for activating the BWP from the network device; and
determining a TCI state set corresponding to the BWP, wherein the TCI state set corresponding to the BWP is a TCI state set in the X TCI state sets configured by the network device, and each TCI state set in the X TCI state sets corresponds to one or more BWPs; and/or,
receiving an indication for activating the BWP from the network device; and
determining 8 states corresponding to the BWP, wherein the 8 states are states selected by the network device using a Media Access Control layer Control Element (MAC CE) from a TCI state set corresponding to the BWP.

* * * * *